United States Patent [19]

Looney

[11] Patent Number: 5,470,021
[45] Date of Patent: Nov. 28, 1995

[54] CABLE SUPPORT APPARATUS AND METHOD

[75] Inventor: James Q. Looney, Fountain Inn, S.C.

[73] Assignee: MPHusky Corporation, Greenville, S.C.

[21] Appl. No.: 147,561

[22] Filed: Nov. 5, 1993

[51] Int. Cl.$^6$ ............................................ F16L 3/00
[52] U.S. Cl. ........................... 248/49; 248/65; 248/68.1
[58] Field of Search ........................... 248/49, 65, 68.1; 403/205, 401, 402, 403

[56] References Cited

U.S. PATENT DOCUMENTS

| | | | |
|---|---|---|---|
| 2,662,709 | 12/1953 | Ullberg, Jr. | 248/68 |
| 2,834,622 | 5/1958 | Reeves | 287/62 |
| 3,053,358 | 9/1962 | Gross | 248/49 |
| 3,351,699 | 11/1967 | Merckle | 248/68.1 |
| 4,232,845 | 11/1980 | Turner | 248/49 |
| 4,513,554 | 4/1985 | Johnson et al. | 52/657 |
| 4,665,676 | 5/1987 | Drzemala | 52/656 |
| 5,100,086 | 3/1992 | Rinderer | 248/49 |

FOREIGN PATENT DOCUMENTS

| 0315023 | 5/1989 | European Pat. Off. | 248/49 |
|---|---|---|---|

*Primary Examiner*—Ramon O. Ramirez
*Assistant Examiner*—Catherine S. Collins
*Attorney, Agent, or Firm*—Ralph Bailey

[57] ABSTRACT

A method and apparatus for effecting changes of direction in cable trays constructed of fiberglass include structural members having ends at a 90° angle at (A) which are supplied with splice plates including corner members (B) presenting converging sides (C). The corner members have web members (D) extending therefrom at an angle complementary to the angle in which a change of direction to be effected at the joint wherein the splice plate is utilized.

7 Claims, 4 Drawing Sheets

Fig. 6.
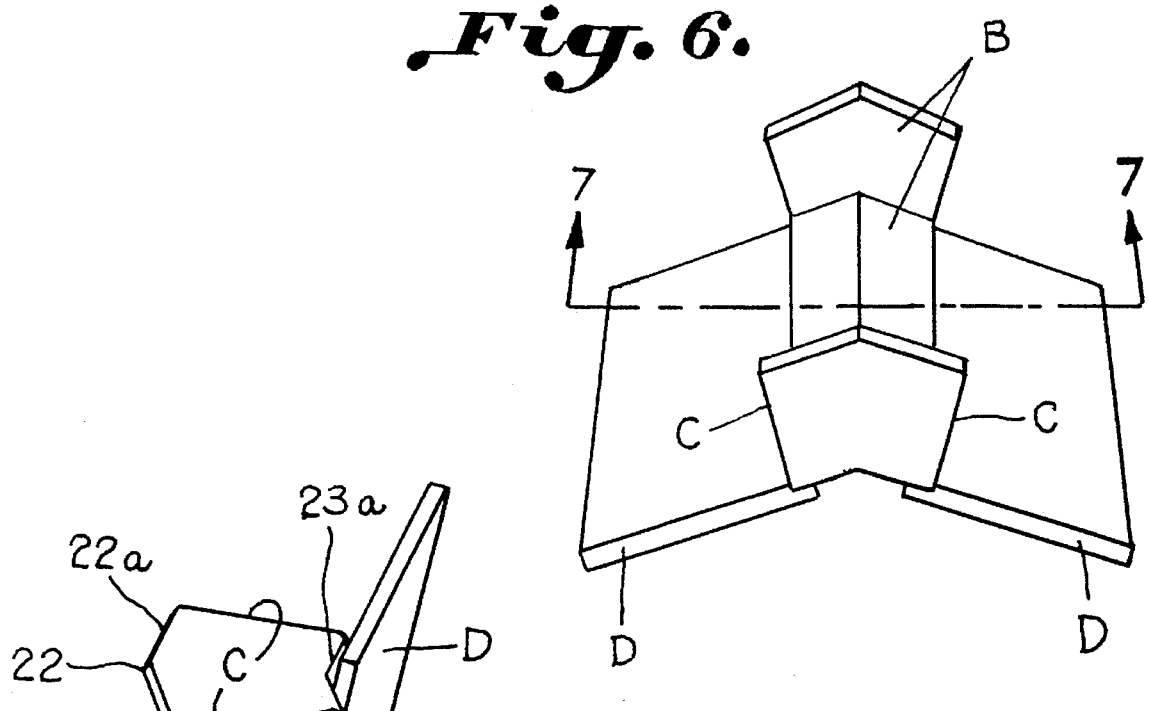
Fig. 5.
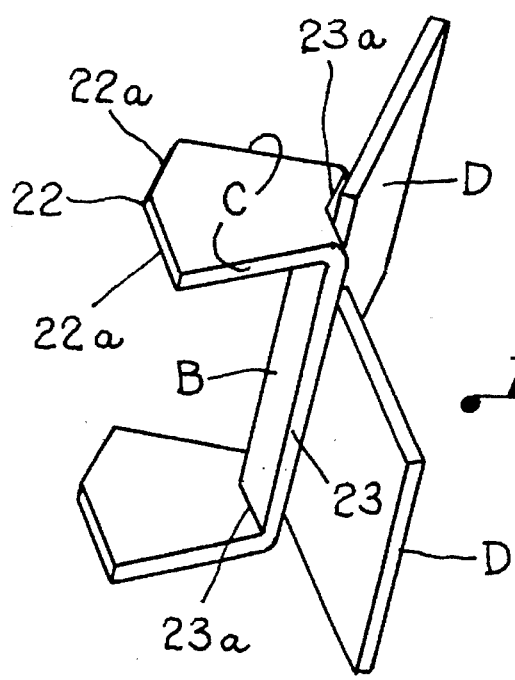
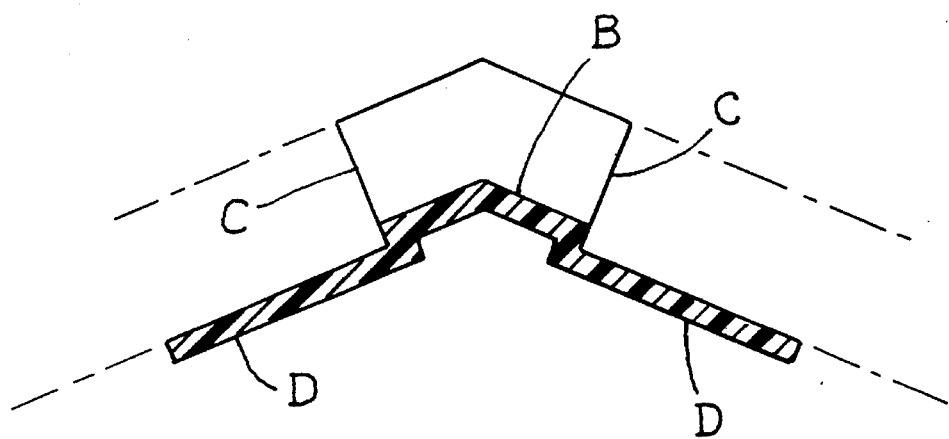
Fig. 7.

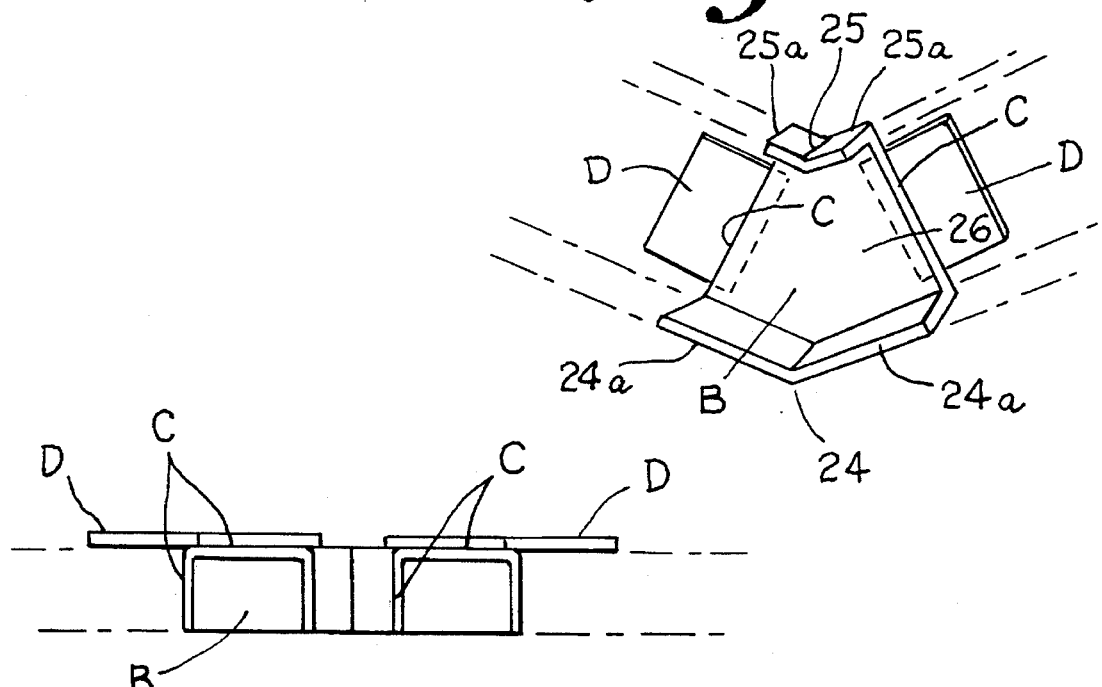
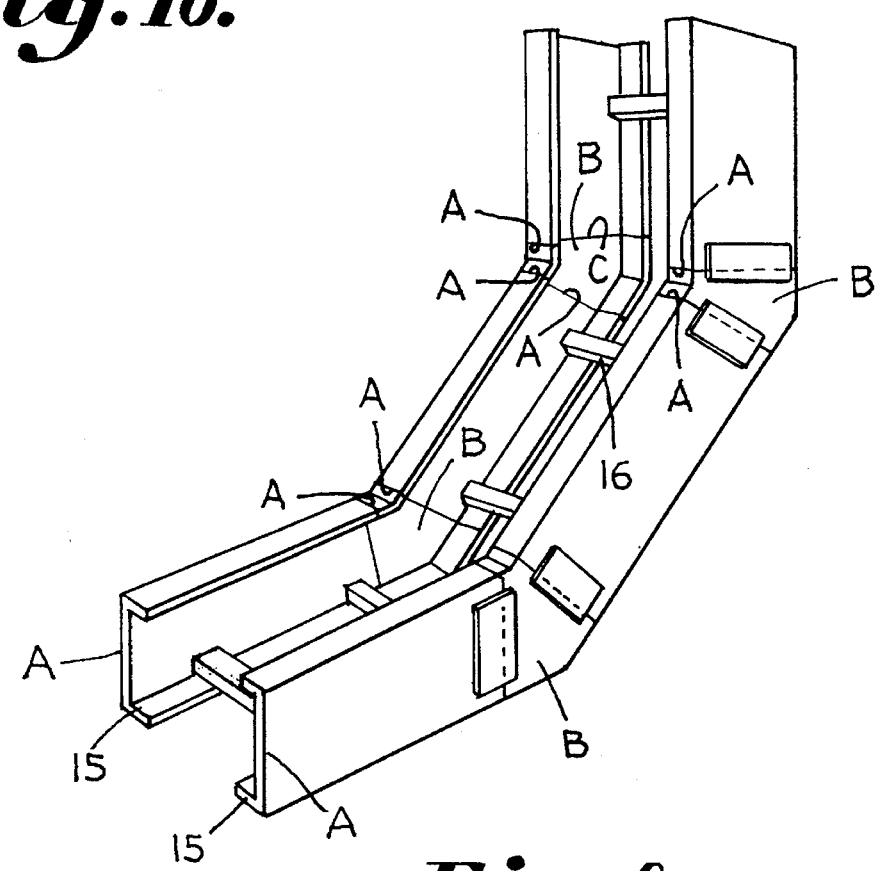

CABLE SUPPORT APPARATUS AND METHOD

BACKGROUND OF THE INVENTION

This invention relates to a cable support apparatus such as cable trays and the like and splice plates for use therewith in making horizontal and vertical changes of direction.

Cable trays have long been made especially of aluminum and steel. It is desirable to make such structures of fiberglass as such is non-corrosive providing structures which are relatively easy to fabricate utilizing epoxy resin and the like for securement of the joints. Cable trays are illustrated generally by U.S. Pat. No. 5,100,086.

Problems are encountered in fabricating cable tray components for effecting changes in direction whether horizontal or vertical. It is common practice to fabricate the components on the job site utilizing splice plates attached to the webs of adjoining sections thus requiring special bending operations. Moreover, the abutting edges of adjacent opposed structural sections must be mitered in order to fit flush with each other across the entire surfaces of the abutting ends of the structural members.

SUMMARY OF THE INVENTION

Accordingly, it is an important object of the present invention to simplify the splice plates and construction techniques to facilitate aligning and positioning the side rails of cable trays prior to bonding.

Another important object of the invention is to provide a component for use with fiberglass cable tray structures consisting essentially of a splice plate with horizontal and vertical cable tray elbows or fittings.

Another object of the invention is to provide novel splice plates for use with fiberglass cable trays which are essentially of three configurations, namely, vertical elbow splice plates, horizontal outside splice plates and horizontal inside splice plates.

An important object of the invention is to provide splice plates of a configuration such as not to require mitering of the straight structural sections. Structural side rail members are cut square or 90° transversely to their longitudinal axis so that any number of splice plates can be used in combination with the straight structural sections to accommodate a variety of angular changes in direction. This configuration eliminates the need for mitering and for bolting the components together during fabrication in many applications, but mechanical connections may be utilized for short times during fabrication utilizing the epoxy resins.

A significant advantage of the invention is to achieve ease of assembly, improved appearance and reduction of inventory with reduced cost through simplification of the cable tray components.

Another important object of the invention is to provide more cost effective fittings for use in cable tray structures manufactured from fiberglass.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 4 illustrates a sectional elevation taken on the line 4—4 in FIG. 2;

FIG. 5 is a perspective view illustrating a horizontal inside splice plate for use in the structure of FIG. 1;

FIG. 6 is a perspective view looking toward the top inside of the splice plate illustrated in FIG. 5;

FIG. 7 is a transverse sectional elevation taken on the line 7—7 in FIG. 6;

FIG. 8 is a perspective view illustrating a vertical cable tray constructed for effecting a 90° vertical change of direction through the use of serially arranged 45° changes in direction;

FIG. 9 is a perspective view of a splice plate utilized in the structure of FIG. 8;

FIG. 10 is a top plan view of the splice plate illustrated in FIG. 9;

DESCRIPTION OF A PREFERRED EMBODIMENT

Figure 1:
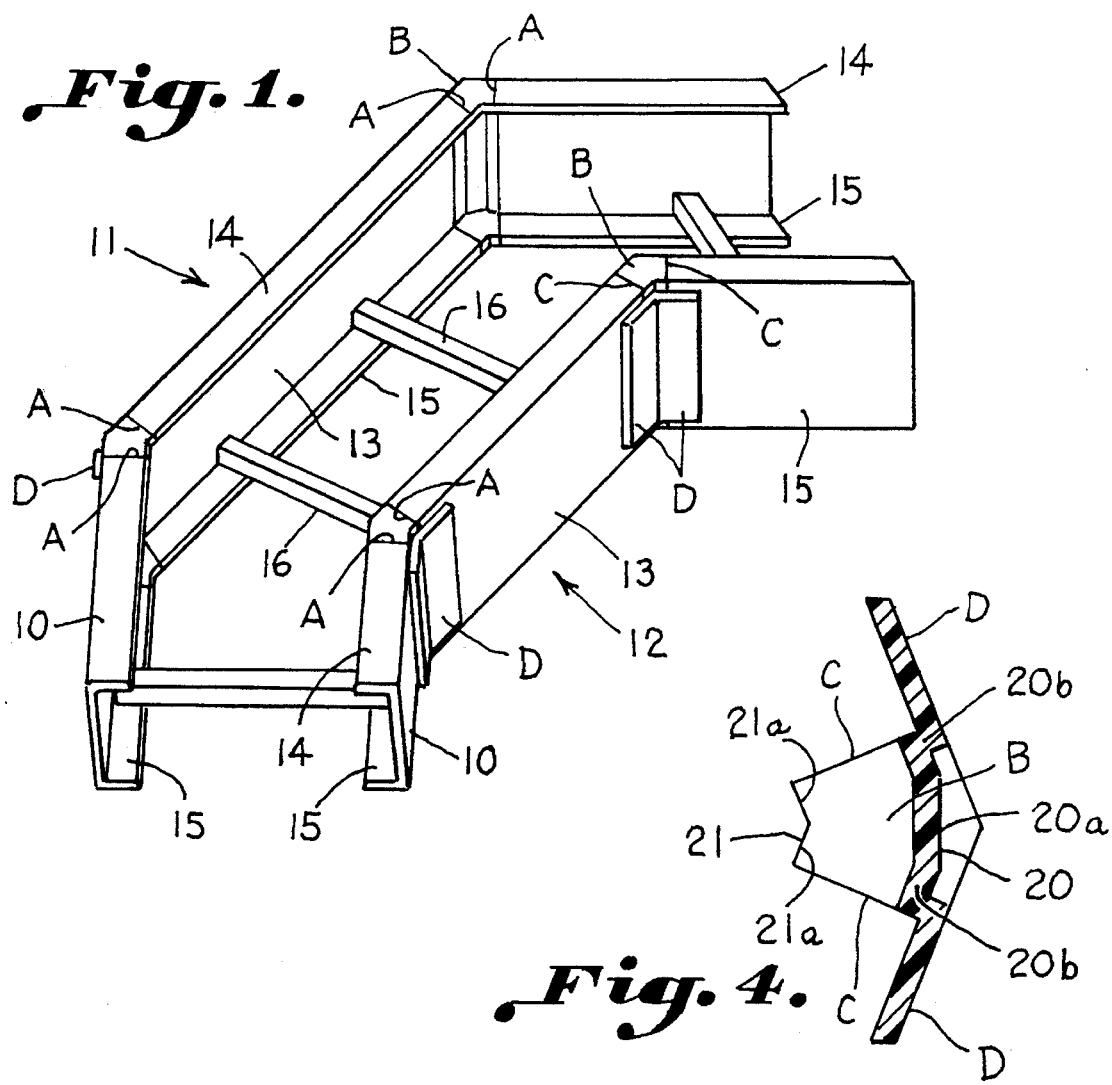
FIG. 1 is a perspective view illustrating a cable tray constructed of fiberglass effecting a 90° horizontal change in direction through the use of two 45° joints made in accordance with the invention.

The drawings illustrate cable support apparatus including a plurality of straight structural sections each having a web and at least one longitudinal flange integral therewith at substantially a right angle thereto. A transverse terminus A is provided at ends of the structural sections squared off at substantially a 90° angle relative thereto. The structural sections are positioned in end to end relation on each side of the cable support apparatus and have transverse cable supports extending between the structural sections on each of the sides. A splice plate is positioned between each of the structural sections where a change of direction at a predetermined angle is to take place. Each of the splice plates include an integral section having a corner member B presenting sides C converging from an apex and having an included angle equal to the predetermined angle, said sides each abutting said web and said at least one longitudinal flange forming an opposing terminus. An angle member D is carried by the corner member at a complementary angle to the web. Preferably the splice plates are of molded construction, although built up sections may be utilized. Thus, mitering is unnecessary, and aid in positioning the structural sections during fabrication resulting in a superior cable support apparatus.

Referring more particularly to FIGS. 1–7, it will be observed that a cable support apparatus includes a plurality of straight structural sections 10 forming outer and inner side rails broadly designated at 11 and 12 respectively. Each of the straight structural sections 10 comprising the outer and inner side rails at a change of direction include a vertical web 13 and a pair of inwardly turned horizontal flanges 14 and 15. Between the opposed lower flanges 15 suitable cross members 16 are carried in spaced relation so as to support the cable and whatever auxiliary brackets or other members are employed therewith in connection with the use of cables in the buildings or other structures in which the cables are to be utilized.

Figures 2, 3:
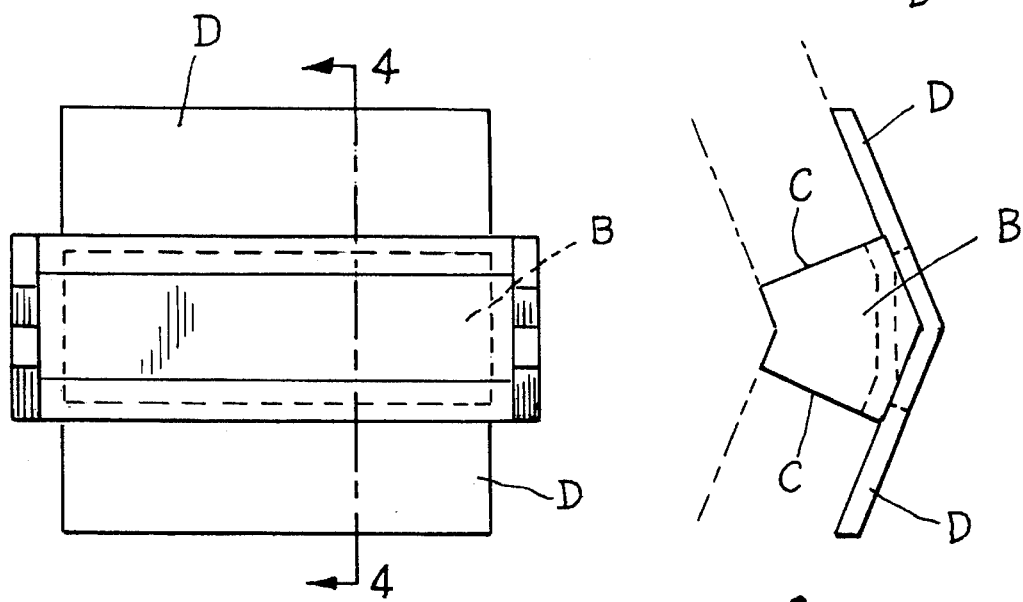
FIG. 2 is a top plan view illustrating a splice plate constructed in accordance with the invention for use in producing the structure illustrated in FIG. 1.
FIG. 3 is a top plan view illustrating a horizontal outside splice plate for use in the cable tray of FIG. 1.

FIG. 2–4 illustrate a splice plate of unitary or integral construction wherein the components are fixedly secured together. The splice plates are constructed preferably as by molding although fabricated constructions may be utilized. The outside splice plates or fixtures contemplate the use of corner members B for securement between a transverse terminus A located between adjoining straight structural sections. It will be observed that the corner post members B present sides C which taper inwardly from an enlarged apex 20 toward a reduced base portion 21. The apex includes a central flat portion 20a with adjoining side sections 20b at each end. The angle members D are essentially web sections which extend outwardly from the ends of the sections 20b disposed at an angle commensurate with the change of direction to be effected at the respective joint as illustrated. The base 21 includes outwardly projecting members having terminating base portions as with a pair of ends at 21a extending outwardly from a central member at an angle commensurate with the change of direction.

Referring more particularly to FIGS. 5–7, an inside splice plate is illustrated for use in the horizontal change of direction structure illustrated in FIG. 1. The splice plates each include a corner member B which present sides C which converge inwardly from an apex 22. The apex has converging sections 22a which extend toward the sides C which in turn converge toward the base 23 which includes a pair of converging sections 23a. The base accommodates the diverging angle members D which over lie adjacent web portions 13 of the straight structural sections at inward joints effecting the change of direction.

Referring more particularly to FIGS. 8–10, a construction for effecting a vertical change of direction with cross members 16 carried between inner flanges 15 each include corner members B presenting converging sides C. The sides C converge from an apex 24 which includes converging web members 24a. The sides C converge therefrom to form a base member 25 formed from diverging sections 25a. The corner member includes an intermediate flat triangular shaped web portion 26 from which extend the angle members B which are illustrated as extending upwardly which include an angle commensurate with the change of direction effected at that joint.

Figure 12:
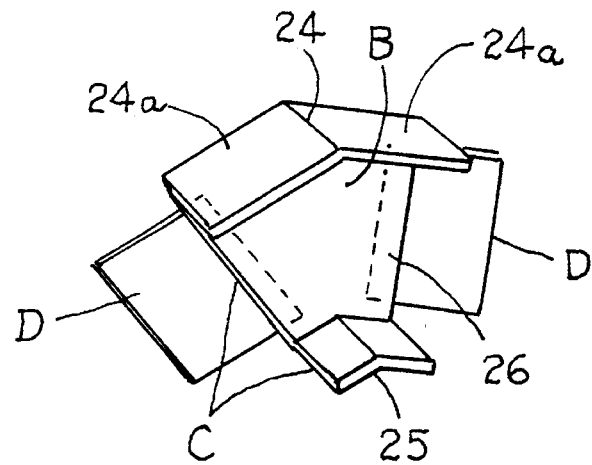
FIG. 12 is a perspective view illustrating a splice plate constructed for use in the structure of FIG. 12.
Figure 13:
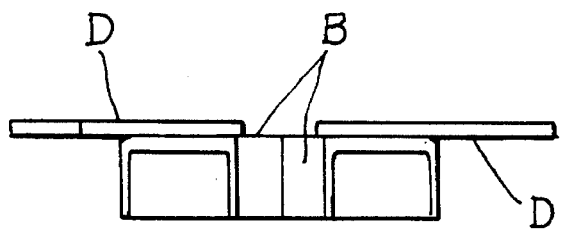
FIG. 13 is a top plan view of the splice plate of FIGS. 11 and 12.
Figure 11:
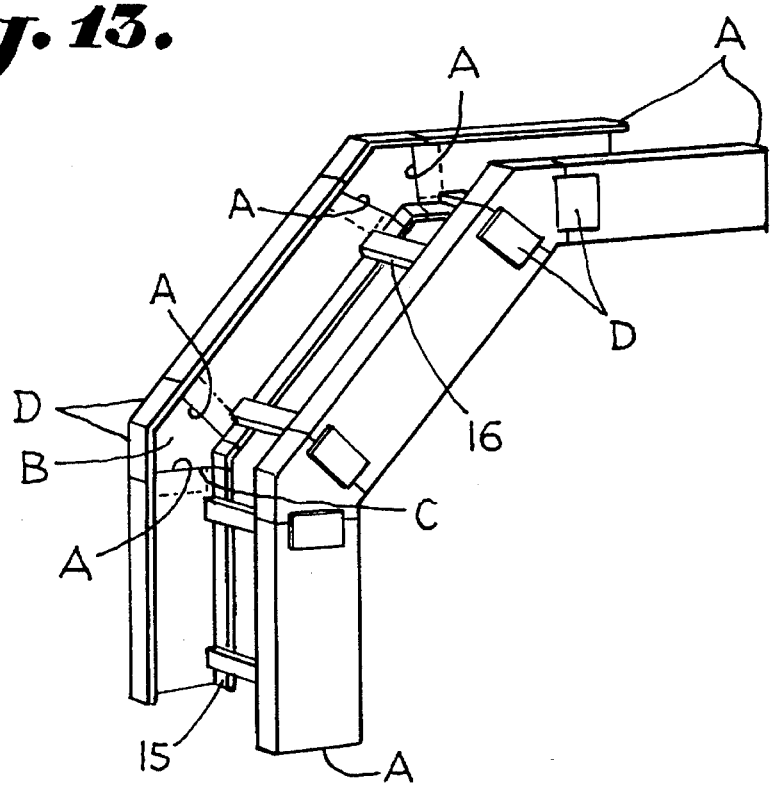
FIG. 11 illustrates a cable tray construction having a vertical inside 90° bend which is similar to FIG. 8 except that the cross members are arranged on the outside rather than the inside of the bend.

Referring now more particularly to FIGS. 11–13, a structure is illustrated wherein cross members 16 are positioned between flanges 15 carried on an outside change of direction as illustrated in FIG. 11. The splice plates of FIGS. 12 and 13 are similar to those described in connection with FIGS. 8–10, except that they are turned upside down depending on the direction of the bend. The same reference characters will be assigned as in FIGS. 8–10 as will be observed by the web members 24a which form the apex 24 opposite the base 25. The intermediate web portion of the corner member B is generally flat as at 26.

It is thus seen that improved structural fittings in the form of standard corner members have been provided for splice plates which may be readily inventoried to accommodate structural assembly at the site without mitering. Three varieties of splice plates of the same generic type are supplied, and the various structural sections joined to form side members accommodating change of direction at any desired location.

While a preferred embodiment of the invention has been described using specific terms, such description is for illustrative purposes only, and it is to be understood that changes and variations may be made without departing from the spirit or scope of the following claims.

What is claimed is:

1. Cable support apparatus comprising:

a plurality of straight channel shaped structural sections each having a web and first and second longitudinal flanges;

a transverse terminus at ends of said structural sections at substantially a 90° angle relative thereto;

said structural sections being positioned in end to end relation and arranged in pairs defining first and second sides, with said first and second flanges of each structural section facing inwardly;

transverse cable supports extending horizontally between said pair of structural sections;

said structural sections and said transverse cable supports forming a trough for containing cable extending longitudinally therein;

a splice plate between each of said structural sections where a change of direction at a predetermined angle is to take place;

said splice plates being employed in complementary pairs where said change of direction is to take place, with a first splice plate positioned between adjoining structural sections on said first side and a second splice plate positioned between adjoining structural sections on said second side of said cable support apparatus;

each of said splice plates including a one-piece section having;

a corner member having a web and first and second spaced apart flanges defining a generally channel-shaped section, said first and second flanges of said corner member presenting sides converging to an apex and having an included angle equal to said predetermined angle, said flange sides and said web each having a distal edge abutting said transverse terminus of said adjoining structural sections in end to end relation and forming a flush relationship with said adjoining structural sections' first and second flanges and web, respectively; and an angle member carried by said corner member at a complementary angle to said web of said adjoining structural sections in closely adjacent overlying relation to said web of said adjoining structural sections for attachment thereto;

wherein mitering of said adjoining structural sections is unnecessary when assembling said cable support apparatus.

2. A splice plate for use in a cable support apparatus having:

a plurality of straight channel shaped structural sections each having a web and first and second longitudinal flanges;

a transverse terminus at ends of said structural sections at substantially a 90° angle relative thereto; and said structural sections being positioned in end to end relation and arranged in pairs defining first and second sides, with said first and second flanges of each structural section facing inwardly;

transverse cable supports extending horizontally between said pair of structural sections, said structural sections and said transverse cable supports forming a trough for containing cable extending longitudinally therein, said splice plates being positioned between each of said structural sections where a change of direction at a predetermined angle is to take place, said splice plates being employed in complementary pairs where said change of direction is to take place, with a first splice plate positioned between adjoining structural sections on said first side and a second splice plate positioned between adjoining structural sections on said second side of said cable support apparatus and comprising:

a one-piece section having;

a corner member having a web and first and second spaced apart flanges defining a generally channel-shaped section, said first and second flanges of said corner member presenting sides converging to an apex and having an included angle equal to said predetermined angle, said flange sides and said web each having a distal edge abutting said transverse terminus of said adjoining structural sections in end to end relation and forming a flush relationship with said adjoining structural sections' first and second flanges and web, respectively; and an angle member carried by said corner member at a complementary angle to said web of said adjoining structural sections in closely adjacent overlying relation to said web of said adjoining structural sections for attachment thereto;

wherein mitering of said adjoining structural sections is unnecessary when assembling said cable support apparatus.

3. The splice plate set forth in claim 2 wherein said splice plate is carried on an outside structural section at a horizontal bend, and wherein said angle member is carried at an apex of said corner member.

4. The splice plate set forth in claim 2 wherein said splice plate is carried on an inside structural section at a horizontal bend, and wherein said angle member is carried at a base of said corner member.

5. The splice plate set forth in claim 2 wherein said splice plate is carried on a structural section at a vertical bend, and wherein angle members project outwardly in opposed relation from and are carried by an intermediate portion of said corner member.

6. The method of making a cable support apparatus having a plurality of straight structural sections each having a web and at least one longitudinal flange, wherein said structural sections are positioned in end to end relation and arranged in pairs defining first and second sides, with said at least one flange of each structural section facing inwardly;

positioning transverse cable supports extending horizontally between said pair of structural sections, said structural sections and said transverse cable supports forming a trough for containing cable extending longitudinally therein, comprising the steps of:

positioning a splice plate between each of said structural sections where a change of direction at a predetermined angle is to take place;

employing a complementary pair of said splice plates where said change of direction is to take place, with a first splice plate positioned between adjoining structural sections on said first side and a second splice plate positioned between adjoining structural sections on said second side of said cable support apparatus;

providing each of said splice plates with a one-piece section having a corner member, said corner member having a web and at least one flange, said at least one flange of said corner member presenting sides converging to an apex and having an included angle, interposing said corner member equal to said predetermined angle with said flange sides and said web each having a distal edge abutting said transverse terminus of said adjoining structural sections in end to end relation and forming a flush relationship with said adjoining structural sections' first and second flanges and web, respectively;

mounting an angle member carried by said corner member at a complementary angle to said web so as to extend over said web in closely adjacent overlying relation to said web for attachment thereto; and fastening said angle members to adjacent webs;

wherein mitering of said adjoining structural sections is unnecessary when assembling said cable support apparatus.

7. The method set forth in claim 6 including the steps of:

providing a transverse terminus at ends of said structural sections at substantially a 90° angle relative thereto; and tapering said corner member to fit between said structural sections to provide a continuous connection therebetween.

* * * * *